United States Patent [19]
Hamada et al.

[11] Patent Number: 5,475,430
[45] Date of Patent: Dec. 12, 1995

[54] DIRECT ENCODING SYSTEM OF COMPOSITE VIDEO SIGNAL USING INTER-FRAME MOTION COMPENSATION

[75] Inventors: Takahiro Hamada, Saitama; Shuichi Matsumoto, Tokyo, both of Japan

[73] Assignee: Kokusai Denshin Denwa Co., Ltd., Tokyo, Japan

[21] Appl. No.: 245,042

[22] Filed: May 17, 1994

[30] Foreign Application Priority Data

May 20, 1993 [JP] Japan ............................ 5-139908

[51] Int. Cl.⁶ ............................................. H04N 11/06
[52] U.S. Cl. ............................................. 348/394; 348/395
[58] Field of Search ..................................... 348/393, 394, 348/395; H04N 11/04

[56] References Cited

U.S. PATENT DOCUMENTS

| | | | |
|---|---|---|---|
| 4,137,549 | 1/1979 | Ichida | 348/394 |
| 4,731,646 | 3/1988 | Kleim | 348/393 |
| 4,910,586 | 3/1990 | Sharpe | 348/394 |
| 4,924,298 | 5/1990 | Kitamura | 348/394 |
| 5,126,841 | 6/1992 | Tanaka et al. | |
| 5,144,426 | 9/1992 | Tanaka et al. | |

Primary Examiner—Howard W. Britton
Attorney, Agent, or Firm—Nikaido, Marmelstein, Murray & Oram

[57] ABSTRACT

Direct encoding of composite video signal which includes both luminance signal (Y) and chrominance signal (C) is carried out without separating luminance signal from chrominance signal. A motion of a block in a frame (8) which provides a motion vector ($MV_x$, $MV_y$), and a from a preceding frame is detected in a motion detector reference block is defined in said preceding frame which is locally decoded according to said motion vector. A block to be encoded in a current frame is converted through Hadamard conversion H (1). A composite motion compensation (7) provides a prediction block according to said reference block, which is subject to phase compensation of color sub-carrier, according to remainder of the value $MV_x+MV_y$ when said value is divided by 4 assuming that sampling frequency of video signal is four times as high as color sub-carrier frequency. The difference (9) of each element between output matrix of said Hadamard conversion (1) and matrix of said prediction block is quantized (2) and encloded (3). The encoded output is transmitted together with said motion vector. Thus, composite video signal is encoded directly signal, and excellent signal quality with high compression ratio is obtained.

6 Claims, 10 Drawing Sheets

PHASE ERROR OF COLOR SUB-CARRIER FOR
EACH MOTION VECTOR (MVx, MVy)

Fig. 4

MVx + MVy = 4n + 3
(90 ERROR : ③)

MVx + MVy = 4n + 2
(0 ERROR : ⓪)

EXCHANGE AND SIGN INVERSION

EXCHANGE

MVx + MVy = 4n
(180 ERROR : ①)

MVx + MVy = 4n + 1
(270 ERROR : ②)

SIGN INVERSION

EXCHANGE

EXCHANGE AND SIGN INVERSION

| -57 | -27 | -19 | -10 | -12 | -18 | -22 | -24 |
|---|---|---|---|---|---|---|---|
| -30 | -19 | -12 | -6 | -5 | -9 | -14 | -17 |
| -24 | -14 | -6 | 2 | 3 | -3 | -9 | -12 |
| -18 | -10 | 0 | 18 | 16 | 3 | -4 | -6 |
| -21 | -10 | -2 | 1 | 6 | 0 | -4 | -8 |
| -23 | -12 | -6 | -2 | 1 | -4 | -8 | -9 |
| -26 | -16 | -11 | -7 | -6 | -9 | -12 | -12 |
| -28 | -22 | -18 | -14 | -14 | -17 | -19 | -18 |

Fig.6(b)

| -55 | -27 | -20 | -17 | -22 | -20 | -3 | -8 | -15 |
|---|---|---|---|---|---|---|---|---|
| -28 | -17 | -11 | -9 | -12 | -12 | -5 | -9 | -17 |
| -22 | -12 | -5 | -1 | -7 | -5 | -1 | -7 | -15 |
| -16 | -8 | 1 | 2 | 7 | -2 | 4 | -4 | -12 |
| -17 | -6 | 0 | 18 | 22 | -1 | -1 | -5 | -13 |
| -20 | -10 | -4 | 6 | 10 | -5 | 3 | -9 | -16 |
| -23 | -13 | -9 | 1 | 3 | -9 | -5 | -16 | -19 |
| -27 | -19 | -16 | -5 | -4 | -17 | -8 | -13 | -15 |

(Note: values partially obscured by hatching in original; transcribed as best visible.)

Fig. 7(a)

| 1 | 2 | 6 | 7 | 15 | 16 | 28 | 29 |
|---|---|---|---|----|----|----|----|
| 3 | 5 | 8 | 14 | 17 | 27 | 30 | 43 |
| 4 | 9 | 13 | 18 | 26 | 31 | 42 | 44 |
| 10 | 12 | 19 | 25 | 32 | 41 | 45 | 54 |
| 11 | 20 | 24 | 33 | 40 | 46 | 53 | 55 |
| 21 | 23 | 34 | 39 | 47 | 52 | 56 | 61 |
| 22 | 35 | 38 | 48 | 51 | 57 | 60 | 62 |
| 36 | 37 | 49 | 50 | 58 | 59 | 63 | 64 |

Fig. 7(b)

| 1 | 4 | 8 | 16 | 17 | 27 | 28 | 38 |
|---|---|---|----|----|----|----|----|
| 5 | 7 | 15 | 18 | 26 | 29 | 37 | 39 |
| 6 | 14 | 19 | 12 | 11 | 36 | 40 | 49 |
| 13 | 20 | 10 | 2 | 3 | 9 | 48 | 50 |
| 21 | 25 | 30 | 23 | 22 | 47 | 51 | 58 |
| 24 | 31 | 35 | 41 | 46 | 52 | 57 | 59 |
| 32 | 34 | 42 | 45 | 53 | 56 | 60 | 63 |
| 33 | 43 | 44 | 54 | 55 | 61 | 62 | 64 |

DIRECT ENCODING SYSTEM OF COMPOSITE VIDEO SIGNAL USING INTER-FRAME MOTION COMPENSATION

BACKGROUND OF THE INVENTION

The present invention relates to a direct encoding system for composite video signal, in particular, relates to such a system which uses Hadmard conversion and inter-frame motion compensation for high quality transmission of video signal.

Conventionally, composite video signal including luminance signal and chrominance signal is converted to component video signal which has separated luminance signal and chrominance signal so that each component signals (luminance signal and chrominance signal) are separately compressed and reproduced. Then, those component signals are combined to composite signal in a reproducing side.

FIG. 9 shows a block diagram of a conventional converter between composite video signal and component video signal.

Figure 9A:
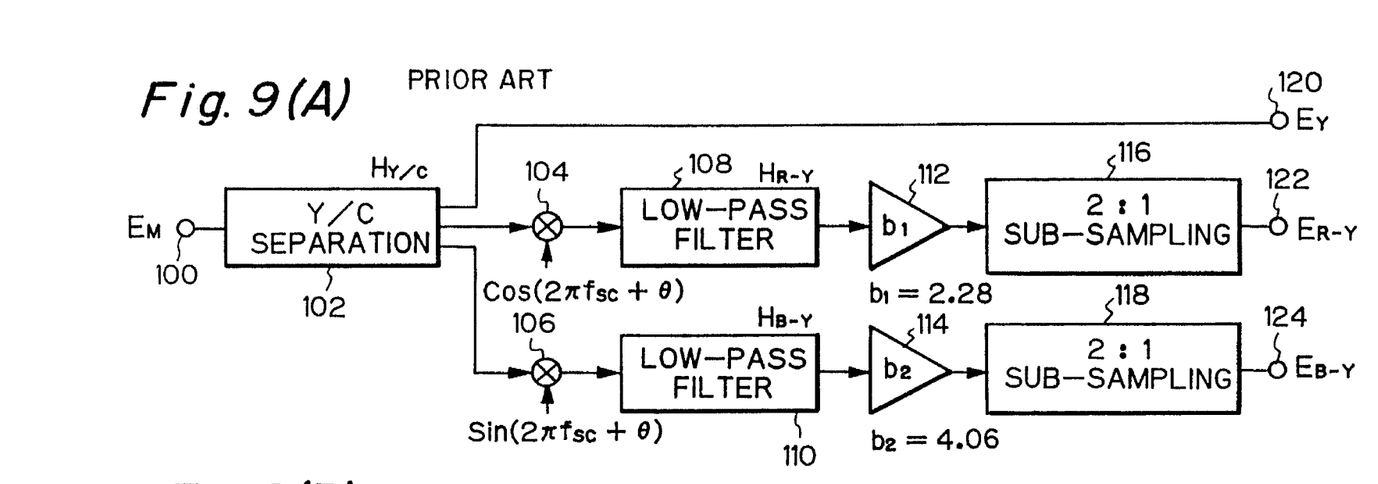
FIG. 9 is a block diagram for conversion between composite video signal and component video signal.

FIG. 9A shows the case that composite video signal is converted to component video signal. In FIG. 9A, the numeral 100 is an input terminal of composite video signal $E_M$ which includes both luminance signal $E_Y$ and chrominance signal. The numeral 102 is a hybrid circuit for separating luminance signal $E_Y$ and chrominance signals ($E_{R-Y}$, $E_{B-Y}$). The separated luminance signal $E_Y$ is output to the output terminal 120. The chrominance signals are applied to the modulators 104 and 106 which modulates the chrominance signals with the sub-carrier signals $\cos(2\pi f_{sc}+\phi)$ and $\sin(2\pi f_{sc}+\phi)$ where $f_{sc}$ is color sub-carrier frequency and is equal to 3.58 MHz. The first chrominance signal ($E_{R-Y}$) thus modulated is applied to the output terminal 122 through the low pass filter 108, the multiplier 112 which multiplies the constant $b_1=2.28$ and the 2:1 sub-sampling circuit 116. Similarly, the second chrominance signal ($E_{B-Y}$) is applied to the output terminal 124 through the low pass filter 110, the multiplier 114 which multiplies the constant $b_2=4.06$ and the 2:1 sub-sampling circuit 118.

Figure 9B:
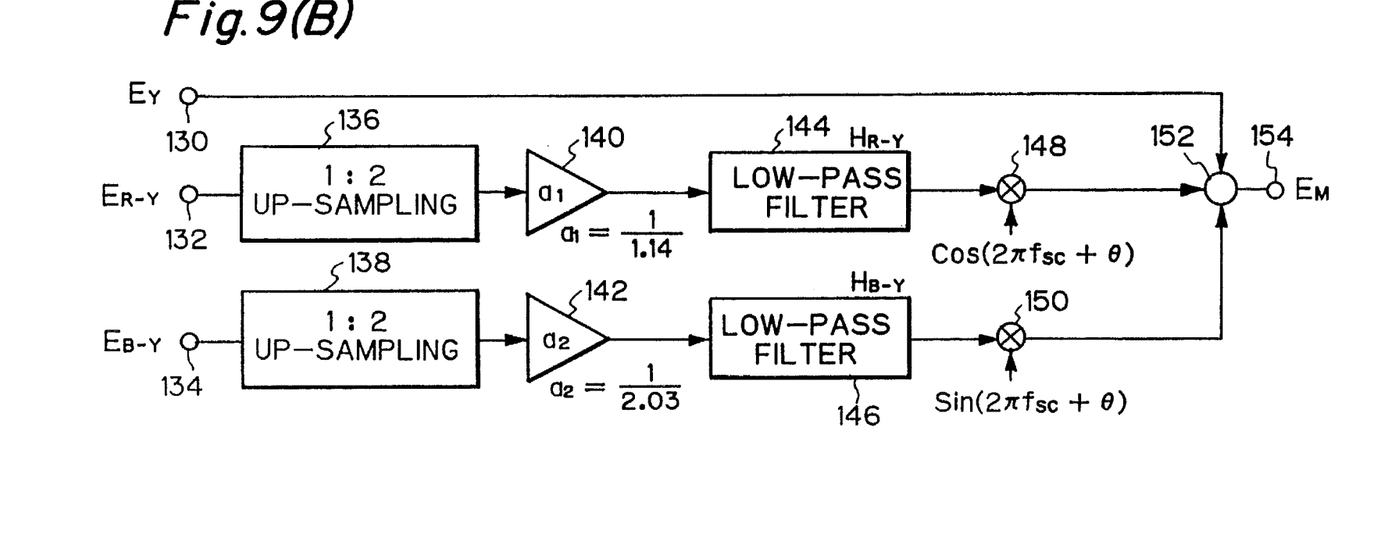

FIG. 9B shows a converter from component video signal to composite video signal. The component signals $E_Y$, $E_{R-Y}$ and $E_{B-Y}$ are applied to the input terminals 130, 132 and 134, respectively. The luminance signal $E_Y$ is applied to the adder 152. The chrominance signals are applied to the 1:2 up-sampling circuits 136 and 138, respectively. The first chrominance signal is applied to the demodulator 148 through the multiplier 140 which multiplies the constant $a_1=1/1.14$, and the low pass filter 144. The second chrominance signal is applied to the demodulator 150 through the multiplier 142 which multiplies the constant $a_2=1/2.03$ and the low pass filter 146. The demodulators 148 and 150 which are supplied with the color sub-carrier signals $\cos(2\pi f_{sc}+\phi)$, and $\sin(2\pi f_{sc}+\phi)$, respectively, demodulate the chrominance signals, and provide the outputs to the adder 152, which provide the composite video signal $E_M$ to the output terminal 154.

If composite video signal is directly encoded without converting it to component signals, a direct encoding system has the advantages that an encoding system is simple in structure, and no signal deterioration due to decrease of resolving power because of the use of filters, leakage between luminance signal and chrominance signal, and the round error in sampling process occurs.

Therefore, a direct encoding system which encodes a composite video signal directly is preferable for high picture quality transmission.

However, conventional information compression system takes inter-frame motion compensated DCT (discrete cosine transform) system which handles component signal with prediction encoding system because of high compression ratio.

When a composite video signal is separated or converted to component video signal, some filters are used for separating luminance signal and chrominance signal, and therefore, deterioration of picture quality is unavoidable.

Therefore, if we try to use component video signal, deterioration of picture quality because of composite to component conversion process is unavoidable. Further, although inter-frame encoding system is useful for high compression ratio, it is not useful for composite video signal, since composite video signal has chrominance signal modulated with sub-carrier signal multiplexed with luminance signal, and therefore, even if a composite video signal is encoded through inter-frame encoding system on time region axis, high compression ratio is not obtained because of phase error of sub-carrier signal.

SUMMARY OF THE INVENTION

It is an object, therefore, of the present invention to overcome the disadvantages and limitations of a prior video signal encoding system by providing a new and improved video signal encoding system.

It is also an object of the present invention to provide a video signal encoding system which encodes directly composite video signal which includes both luminance signal and chrominance signal without separating those signals.

The above objects are attained by a direct encoding system of composite video signal using inter-frame motion compensation comprising; an input terminal for receiving a block of input composite video signal which includes both luminance signal (Y) and chrominance signal (C) modulated with color sub-carrier signal, said block being a part of video frame, and having a plurality of pels; a first Hadamard converter coupled with said input terminal for effecting Hadamard conversion for each block in said input composite video signal; a subtractor for providing difference between each element of matrix of output of said first Hadamard converter and each related element of matrix of a prediction block; a quantizer for quantizing output of said subtractor; a first encoder for encoding output of said quantizer; an inverse quantizer coupled with output of said quantizer; an adder coupled with output of said inverse quantizer for providing sum of said output and said prediction block; a second Hadamard converter coupled with output of said adder for providing inverse Hadamard conversion; a frame memory coupled with output of said second Hadamard converter to store a frame of locally decoded video signal; a motion detector coupled with said input terminal through a luminance separation circuit, and output of said frame memory through a luminance separation circuit to provide motion vector ($MV_x$, $MV_y$) of each block between a current frame and a preceding frame; a composite motion compensator having at least a third Hadamard conversion unit, and a phase compensation circuit, coupled with output of said motion detector, and output of said frame memory, to determine a reference block in a preceding frame according to said motion vector ($MV_x$, $MV_y$), to carry out Hadamard conversion to said reference block, to effect phase compensation of color sub-carrier of said Hadamard converted reference block, so that the phase compensated reference block is applied to said subtractor as said prediction block; a second encoder for encoding said motion vector; a multiplexer for multiplexing outputs of said first encoder and said second encoder; and an output terminal coupled with output of said multiplexer to provide encoded video signal.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

The basic concepts of the present invention have three steps. The first step may be carried out solely. The combination of the steps (1) and (2), and/or the combination of the steps (1), (2) and (3) may be carried out so that the further improved effect is obtained as compared with the case with only the step (1).

The step (1) is to effect Hadamard conversion to composite video signal so that color sub-carrier component is packed to small number of coefficients or elements of the matrix of Hadamard converted signal, and differential quantization (DPCM) is carried out by using a reference block which is obtained through motion detection for each block between a current frame and a preceding frame. The step (2) is the phase compensation of color sub-carrier component according to sum of elements of motion vector. The step (3) is the motion compensation for a reference block with half pel spacing through interpolation for matrix of Hadamard converted block which is locally decoded so that high picture quality is obtained in spite of high compression ratio.

The embodiment is assumed that composite video signal is NTSC composite signal, but it should be appreciated of course that the concepts of the present invention are applicable to other video standards.

(1) Step (1)

First, direct encoding using inter-frame compression through Hadamard conversion is described.

Figure 1:
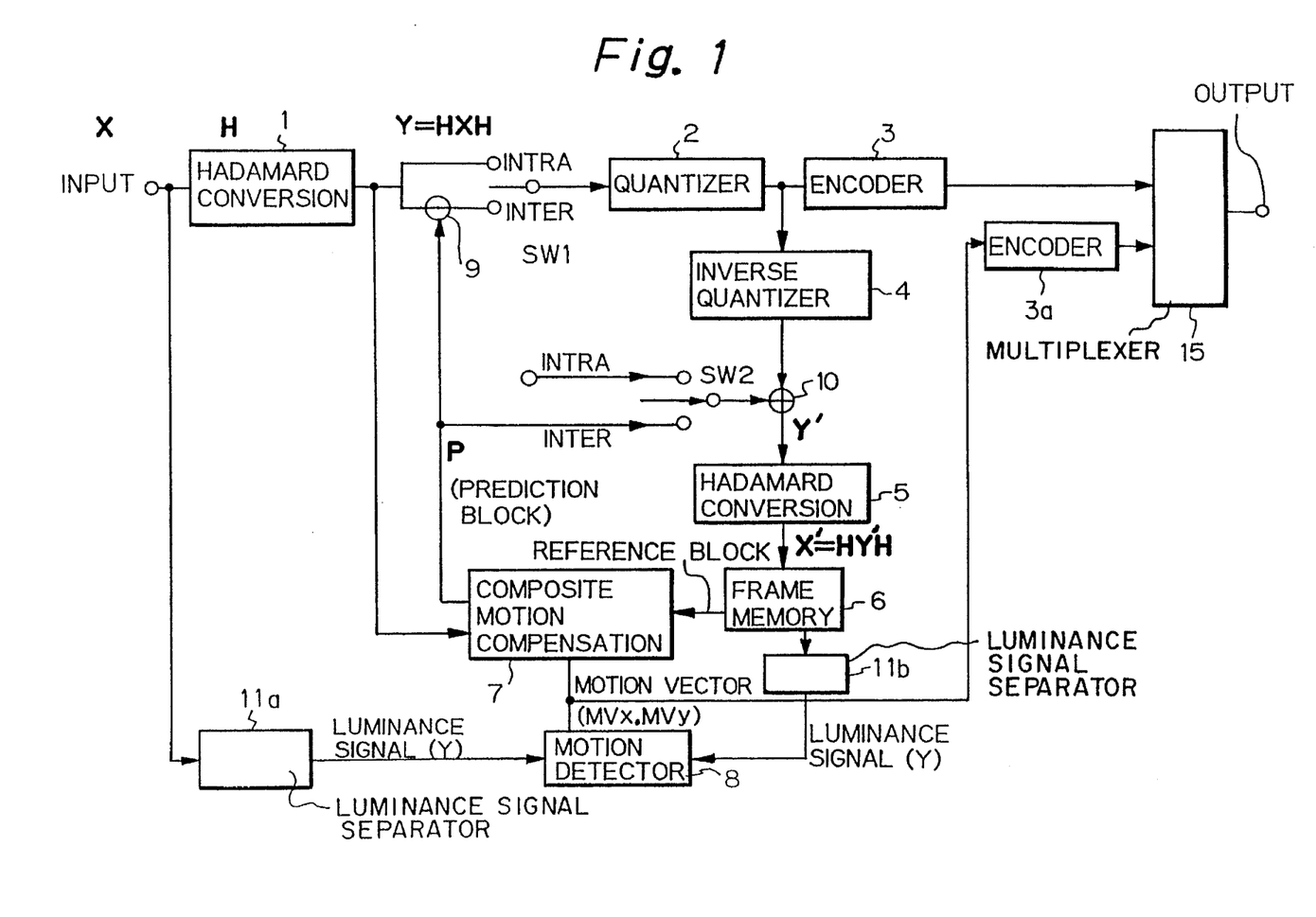
FIG. 1 is a block diagram of a direct composite video signal encoder according to the present invention.

FIG. 1 shows a block diagram of an encoder according to the present invention. In the figure, the numerals 1 and 5 are an Hadamard conversion unit, 2 is a quantizer, 3 is a first encoder for encoding output of the quantizer 2, 3a is a second encoder for encoding elements of motion vector, 4 is an inverse quantizer, 6 is a frame memory having the capacity of one frame of picture, 7 is a composite motion compensation, 8 is a motion detector, 9 is a digital subtractor, 10 is a digital adder, 11a and 11b are a separator of luminance signal, SW1 and SW2 are a switch, and 15 is a multiplexer for multiplexing outputs of the first encoder 3 and the second encoder 3a.

It is assumed that an input composite video signal is interlace signal, which is field-merged at the input portion so that a frame signal is input to the system.

In the present invention, a frame is divided into a plurality of blocks, each of which has a plurality of pels. In a preferred embodiment, each block has 8×8 (=64) pels. So, a block is expressed by a vector or matrix X which has 8×8 (=64) elements $X_{i,j}$ (i,j=1–8). When a block has 8×8 pels, an Hadamard conversion unit is 8 order Hadamard conversion unit. The 8 order Hadamard matrix is expressed as follows.

$$H_8 = \begin{pmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \end{pmatrix}$$

The Hadamard conversion unit 1 carries out the Hadamard conversion to an input block and provides the Hadamard converted block Y as follows.

$$Y = H \times X \times H$$

The converted block Y has also 8×8 elements $Y_{i,j}$ (i,j=1–8).

All the blocks in a picture frame are carried out the above Hadamard conversion for each block. Therefore, an inter-frame DPCM loop is carried out for elements of Hadamard converted block signal.

The quantizer 2 quantizes the difference between an output Y of the Hadamard conversion 1 and a prediction block P, and the inverse quantizer 4 carries out the inverse quantization to provide reproduced picture signal, which is applied to the Hadamard conversion 5 through an adder 10 which adds the prediction block P to the output of the inverse quantizer 4 for inverse Hadamard conversion so that the video signal of time region is locally reproduced and is stored in the frame memory 6.

The motion detector 8 takes luminance signal (intensity signal) of an output of the frame memory 6, which stores a preceding frame, through a luminance signal separator 11b, and a block of luminance signal from an input signal through a luminance signal separator 11a. The structure of the separators 11a and 11b are similar to the hybrid circuit 102 in FIG. 9A.

The motion detector 8 determines a motion vector ($MV_x$, $MV_y$) of the current block, through block matching operation between a current block and each block in a preceding frame. In other words, (see FIG. 2B), the block $B_{11}$ in the current frame having 8×8 (=64) pels is considered that it moves from a reference block $B_{01}$ in the preceding frame with the motion vector ($MV_x$, $MV_y$).

The motion vector has precision with one pel spacing in horizontal direction, and two lines precision spacing in vertical direction considering interlace.

Figure 2A:
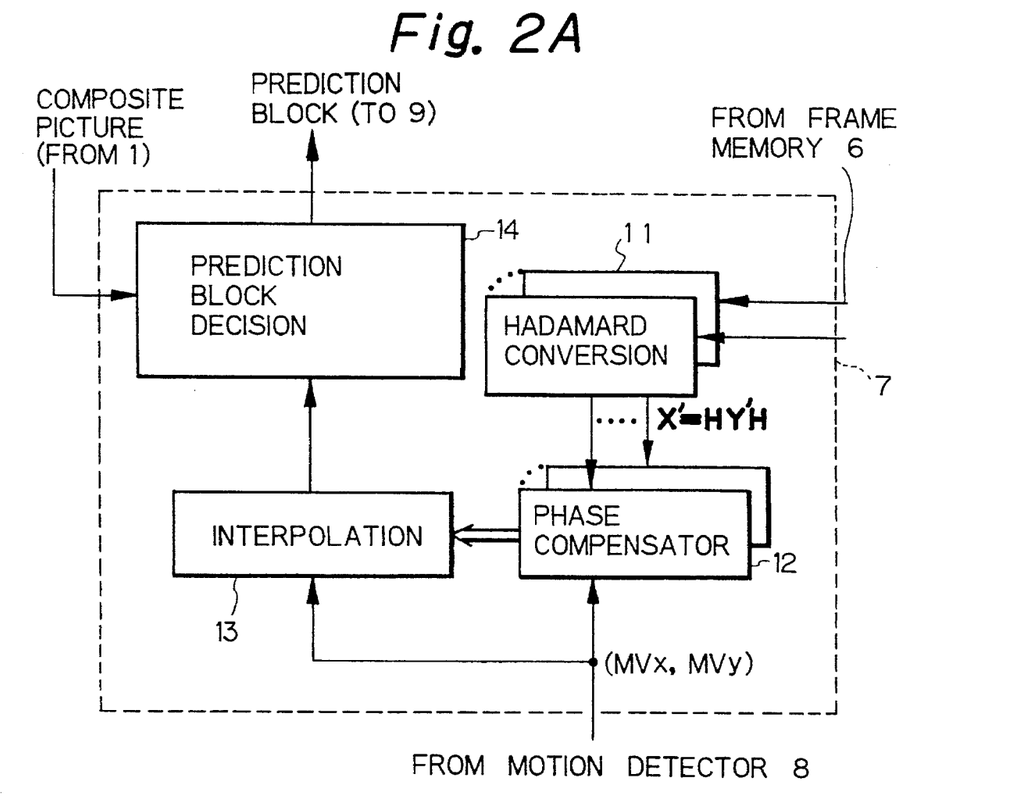
FIG. 2A is a block diagram of a composite motion compensation 7 in FIG. 1.
Figure 2B:
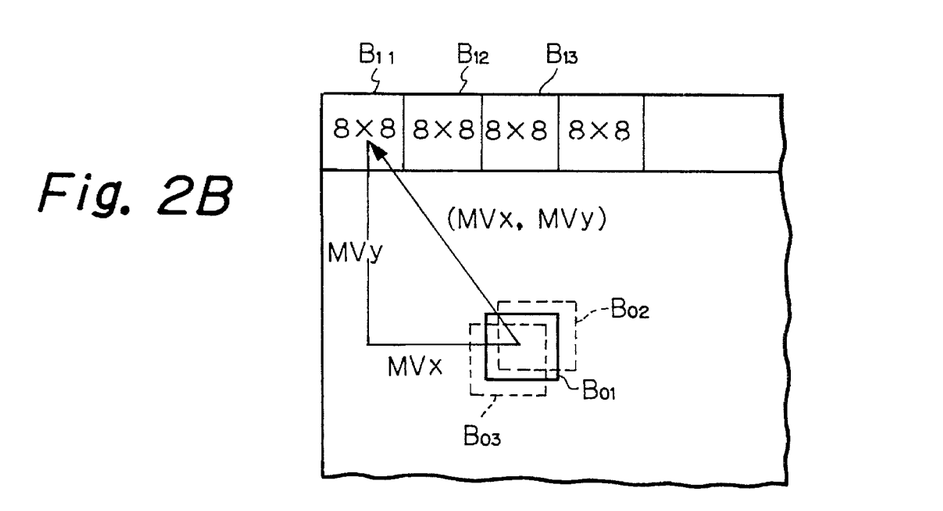
FIG. 2B is the explanatory figure of motion compensation.

FIG. 2A shows a block diagram of the composite motion compensation 7. In FIG. 2A, the numeral 11 is an Hadamard conversion, 12 is a phase compensator, 13 is an interpolator, and 14 is a prediction block decision unit.

The composite motion compensation 7 takes a reference block from the frame memory 6, according to the motion vector. The reference block thus taken is applied to the Hadamard conversion unit 11. Preferably, a plurality of reference blocks ($B_{01}$, $B_{02}$, $B_{03}$ et al) are taken for each current block, and a plurality of Hadamard conversion units 9 are provided for each reference blocks, for providing excellent picture quality. When a plurality of reference blocks are taken, those blocks are adjacent blocks with one another determined by the motion vector. Preferably, a number of reference blocks is nine (9), so that three continuous blocks in horizontal direction, and three continuous blocks in vertical direction are taken.

Each of the Hadamard conversion units 11 effects the 8×8 Hadamard conversion for each reference block.

The phase compensator 12 carries out the phase compensation of color sub-carrier in each block according to the motion vector, since color sub-carrier in each block may have phase error of 0°, 90°, 180° or 270° between a current frame and a preceding frame, due to the fact that the sampling frequency of video signal is four times as high as the frequency of color sub-carrier.

It should be noted that a plurality of phase compensators 12 are provided when a plurality of reference blocks are taken.

After the phase compensation for color sub-carrier, the interpolator 13 provides the interpolated blocks $I_m$ (m=1–15) so that an interpolated block has coordinates with fraction although a reference block read out of the frame memory has coordinates with integer. Preferably, the interpolator provides 15 interpolated blocks with fraction precision from 9 reference blocks with integer precision.

The prediction block decision unit 14 selects a prediction block P ($P_{i,j}$, i,j=1–8) from said interpolated blocks $I_m$ ($I_{m(i,j)}$, i,j=1–8, m=1–15) so that the selected prediction block P has the minimum sum of absolute value of difference of Hadamard converted elements of the same coordinate between a candidate block $I_m$ (interpolated block) and a block Y ($Y_{i,j}$, i,j=1–8) to be encoded. In other words, one of the interpolated blocks $I_m$ is selected as the prediction block so that the value of $$\sum_{i,j} |Y_{(i,j)} - I_{m(i,j)}|$$

is the minimum for each value of m.

The prediction block P thus selected is applied to the subtractor 9, which provides the difference (Y–P) of each element between a matrix of a block to be encoded and a matrix of a prediction block, for the purpose of DPCM (differential pulse code modulation). The prediction block is also applied to the adder 10 through switch SW2 when it is inter mode.

Then, the sum of the absolute value of Hadamard converted elements Y (=$Y_{i,j}$) of the output of the Hadamard converter 1, and the output (Y–P) of the subtractor 9 are compared, except for the DC component ($Y_{1,1}$ and $(Y-P)_{1,1}$) on the Hadamard converted elements. When the former is the smaller, an intra mode is selected, and when the latter is the smaller, an inter mode is selected. The switches SW1 and SW2 in FIG. 1 are switched whether it is intra mode or inter mode.

Similarly, the succeeding blocks $B_{12}$, $B_{13}$ et al (see FIG. 2B) are encoded.

(2) Step 2

Next, phase compensation of color sub-carrier is described.

Chrominance signal C in NTSC signal is expressed as follows.

$$C=(1/1.14)(E_R-E_Y)\cos(W_{sc}t)+(1/2.03)(E_B-E_y)\sin(W_{sc}t) \quad (1)$$

where $W_{sc}$ is angular frequency of color sub-carrier component. The equation (1) is converted as follows.

$$C = A \cos(W_{sc}t + \phi) \quad (2)$$

$$A = 1\sqrt{((E_R - E_Y)/1.14)^2 + ((E_B - E_Y)/1.03)^2}$$

$$\tan\phi = -1.7(E_B - E_Y)/(E_R - E_Y)$$

Therefore, if the color video signal is sampled with the sampling frequency which is four times as high as the color sub-carrier frequency, the coded block $S_{frame}$ in a frame (which is field merged) is shown as follows.

$$S_{frame} = \begin{pmatrix} x_{11}, & y_{12}, & -x_{13}, & -y_{14}, & x_{15}, & y_{16}, & -x_{17}, & -y_{18} \\ x_{21}, & y_{22}, & -x_{23}, & -y_{24}, & x_{25}, & y_{26}, & -x_{27}, & -y_{28} \\ -x_{31}, & -y_{32}, & x_{33}, & y_{34}, & -x_{35}, & -y_{36}, & x_{37}, & y_{38} \\ -x_{41}, & -y_{42}, & x_{43}, & y_{44}, & -x_{45}, & -y_{46}, & x_{47}, & y_{48} \\ x_{51}, & y_{52}, & -x_{53}, & -y_{54}, & x_{55}, & y_{56}, & -x_{57}, & -y_{58} \\ x_{61}, & y_{62}, & -x_{63}, & -y_{64}, & x_{65}, & y_{66}, & -x_{67}, & -y_{68} \\ -x_{71}, & -y_{72}, & x_{73}, & y_{74}, & -x_{75}, & -y_{76}, & x_{77}, & y_{78} \\ -x_{81}, & -y_{82}, & x_{83}, & y_{84}, & -x_{85}, & -y_{86}, & x_{87}, & y_{88} \end{pmatrix}$$

$$= [X_1, Y_2, X_3, Y_4, X_5, Y_6, X_7, Y_8] \quad (3)$$

where $x_{ij}=A_{ij}\cos(\phi_{ij}+\Theta)$, $Y_{ij}=A_{ij}\sin(\phi_{ij}+\Theta)$, $\Theta$ is constant, When it is assumed that the motion detection is carried out with one pel precision in horizontal direction, and two lines precision in vertical direction considering interlace, the phase error of color sub-carrier signal between a coded block and a reference block may be one of 0°, 90°, 180° and 270°. That phase error occurs because of the sampling frequency which is four times as high as the color sub-carrier frequency.

Figure 3:
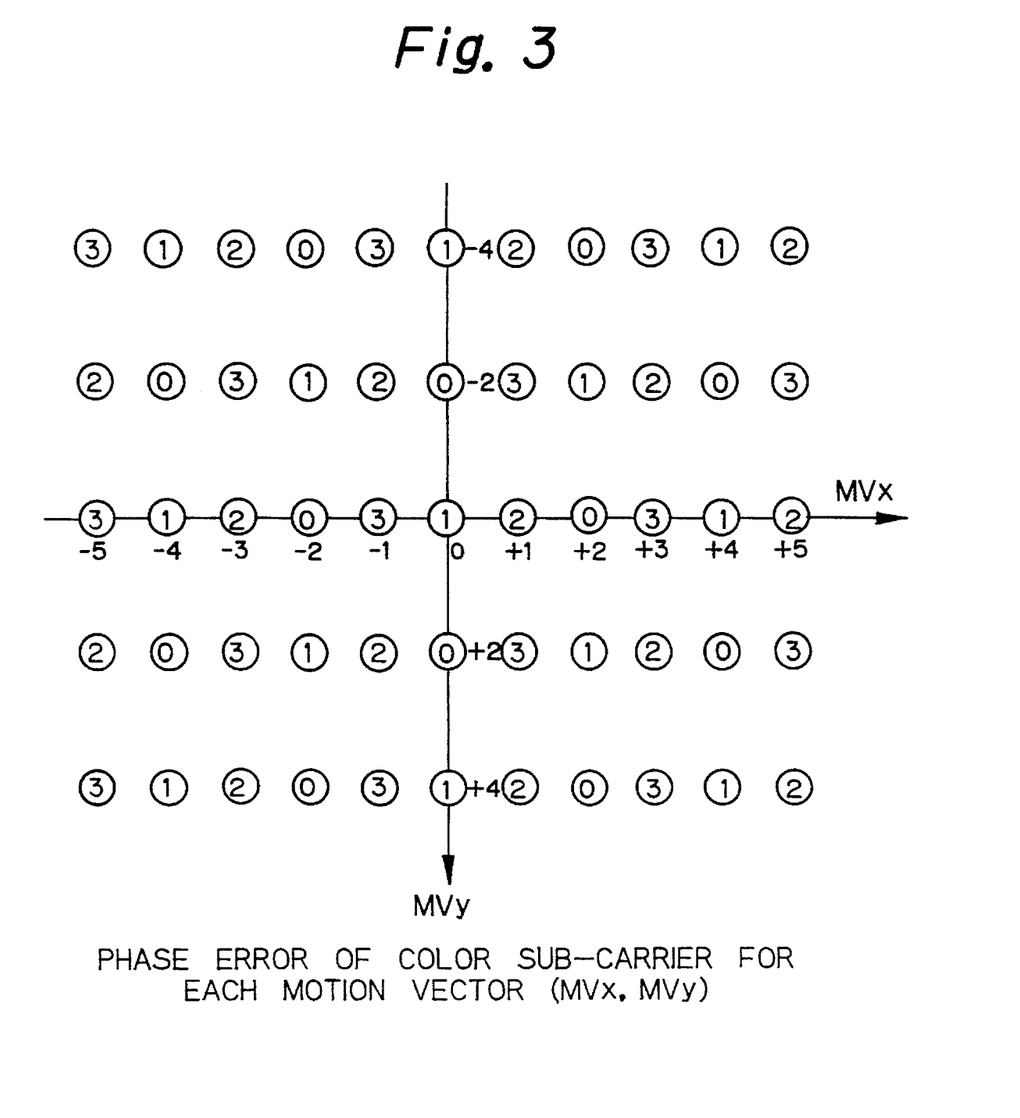
FIG. 3 is explanatory figure of phase error of sub-carrier for each motion vector.

When the motion vector ($MV_x$, $MV_y$) is defined so that $MV_x$ is positive (+) in right direction, and $MV_y$ is positive (+) in downward direction, watching a preceding frame (reference frame) from a current frame (coded frame), the relations between the motion vector ($MV_x$, $MV_y$) and the phase error of color sub-carrier are shown in the expression (4) and FIG. 3, where n is an integer, depending upon a remainder (0, 1, 2 or 3) when $MV_x+MV_y$ is divided by 4. In FIG. 3, a number (0, 1, 2 or 3) in a circle shows the code of the phase error in the equation (4).

$$MV_x + MV_y = \begin{cases} 4n+2 & (0°, \quad \text{phase error code; (0))} \\ 4n & (180° \quad \text{phase error code; (1))} \\ 4n+2 & (270° \quad \text{phase error code; (2))} \\ 4n+3 & (90° \quad \text{phase error code; (3))} \end{cases} \quad (4)$$

Therefore, if we shift the phase of color sub-carrier on $S_{frame}$ by 0°, 90°, 180° or 270° the following equation (5) is obtained.

$$S_{frame}(0°) = [\ X_1,\ \ Y_2, -X_3, -Y_4,\ \ X_5,\ \ Y_6, -X_7, -Y_8] \quad (5)$$

$$S_{frame}(90°) = [-Y_1,\ \ X_2,\ \ Y_3, -X_4, -Y_5,\ \ X_5,\ \ Y_7, -X_8]$$

$$S_{frame}(180°) = [-X_1, -Y_2,\ \ X_3,\ \ Y_4, -X_5, -Y_6,\ \ X_7,\ \ Y_8]$$

$$S_{frame}(270°) = [\ Y_1, -X_2, -Y_3,\ \ X_4,\ \ Y_5, -X_6, -Y_7,\ \ X_8]$$

$S_{frame}(90°)$, $S_{frame}(180°)$ and $S_{frame}(270°)$ relate to the cases that $S_{frame}(0°)$ shifts by 1 pel length, 2 pels length, and 3 pels length, respectively, in horizontal direction.

It is assumed in chrominance signal that the correlation between pels is strong, and two adjacent pels in horizontal direction are the same as each other, so that the following equation is satisfied.

$$A_{i1} = A_{i2},\ A_{i3} = A_{i4},\ A_{i5} = A_{i6},\ A_{i7} = A_{i8} \quad (6)$$

$$\phi_{i1} = \phi_{i2},\ \phi_{i3} = \phi_{i4},\ \phi_{i5} = \phi_{i6},\ \phi_{i7} = \phi_{i8}$$

Accordingly, the following equation (7) and the table 1 are obtained.

$$S_{frame}(0°) = [\ X_1,\ \ Y_1, -X_3, -Y_3,\ \ X_5,\ \ Y_5, -X_7, -Y_7] \quad (7)$$

$$S_{frame}(90°) = [-Y_1,\ \ X_1,\ \ Y_3, -X_3, -Y_5,\ \ X_5,\ \ Y_7, -X_7]$$

$$S_{frame}(180°) = [-X_1, -Y_1,\ \ X_3,\ \ Y_3, -X_5, -Y_5,\ \ X_7,\ \ Y_7]$$

$$S_{frame}(270°) = [\ Y_1, -X_1, -Y_3,\ \ X_3,\ \ Y_5, -X_5, -Y_7,\ \ X_7]$$

The Hadamard conversion in horizontal direction is carried out by multiplying 8×8 Hadamard matrix H to $S_{frame}$ from right, where it is assumed that the matrix H is arranged in sequence. The Hadamard conversion of multiplying H only from right is enough in considering phase error, although the Hadamard conversion in the converters 1 and 5 are carried out in both directions, since phase error occurs only in horizontal direction.

Table 1 shows the conversion result showing for each line vector for four kinds of $S_{frame}$. It should be appreciated in table 1 that $S_{frame}(90°)H$, $S_{frame}(180°)H$ and $S_{frame}(270°)H$ may become equal to $S_{frame}(0°)H$ by exchanging lines, and/or inversing polarity, so that the phase error of color sub-carrier is compensated, and the correlation between frames for chrominance signal is improved.

Figure 4:
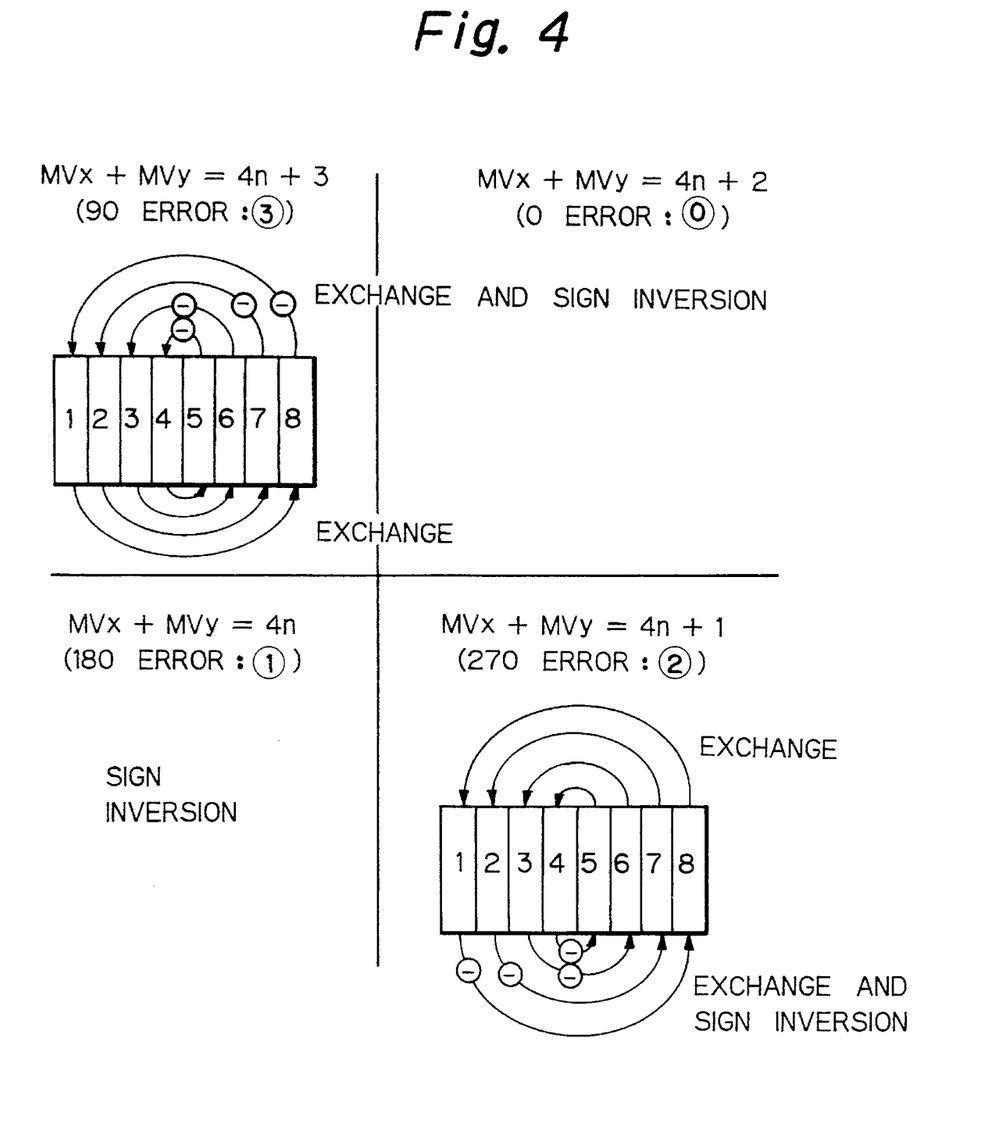
FIG. 4 shows phase compensation of sub-carrier for each motion vector.

FIG. 4 shows shematically the phase compensation shown in the table 1.

In the table 1 and FIG. 4, when $MV_x MV_y = 4n \pm$ (the remainder is 4 when $MV_x + MV_y$ is divided by 4, and the phase error is 90°), the phase error is compensated to 0° by inserting the line 8 into the line 1 with the sign conversion, inserting the line 7 into the line 1 with the sign conversion, inserting the line 6 into the line 3 with the sign conversion, inserting the line 5 into the line 4 with the sign conversion, inserting the line 4 into the line 5 with no sign conversion, inserting the line 3 into the line 6 with no sign conversion, inserting the line 2 into the line 7 with no sign conversion, and inserting the line 1 into the line 8 with no sign conversion.

When the phase error is 0°, no exchange nor sign conversion is necessary.

when the phase error is 180°, it is compensated to the phase error 0° by converting the sign.

When the phase error is 270°, it is compensated to the phase error 90° by inverting the sign, and the phase error 90° is compensated to the phase error 0° as mentioned above.

As mentioned above, some elements or coefficients of the result of the Hadamard conversion of a reference block are exchanged and/or the polarity or the sign is inversed between the lines of the Hadamard converted matrix, so that the phase error of color sub-carrier which is specific to composite video signal is compensated between a coded block and a reference block. Therefore, the four patterns of the phase error of the color sub-carrier are changed only to one pattern, and the information compression ratio is improved.

TABLE 1

Horizontal elements of each line for each phase error of color sub-carrier

| Matrix | line | element |
|---|---|---|
| $S_{frame}$ (0°) H | 1 | $X_1+Y_1-X_3-Y_3+X_5+Y_5-X_7-Y_7$ |
| | 2 | $X_1+Y_1-X_3-Y_3-X_5-Y_5+X_7+Y_7$ |
| | 3 | $X_1+Y_1+X_3+Y_3-X_5-Y_5-X_7-Y_7$ |
| | 4 | $X_1+Y_1+X_3+Y_3+X_5+Y_5+X_7+Y_7$ |
| | 5 | $X_1-Y_1-X_3-Y_3+X_5-Y_5+X_7-Y_7$ |
| | 6 | $X_1-Y_1+X_3-Y_3-X_5+Y_5+X_7-Y_7$ |
| | 7 | $X_1-Y_1-X_3+Y_3-X_5+Y_5+X_7-Y_7$ |
| | 8 | $X_1-Y_1-X_3+Y_3+X_5-Y_5-X_7+Y_7$ |
| $S_{frame}$ (90°) H | 1 | $-Y_1+X_1+Y_3-X_3-Y_5+X_5-Y_7-X_7$ |
| | 2 | $-Y_1+X_1-Y_3-X_3+Y_5-X_5-Y_8+X_7$ |
| | 3 | $-Y_1+X_1-Y_3+X_3+Y_5-X_5+Y_7-X_7$ |
| | 4 | $-Y_1+X_1-Y_3+X_3-Y_5+X_5-Y_7+X_7$ |
| | 5 | $-Y_1-X_1-Y_3-X_3-Y_5-X_5-Y_7-X_7$ |
| | 6 | $-Y_1-X_1-Y_3-X_3+Y_5+X_5+Y_7+X_7$ |
| | 7 | $-Y_1-X_1+Y_3+X_3+Y_5+X_5-Y_7-X_7$ |
| | 8 | $-Y_1-X_1+Y_3+X_3-Y_5-X_5+Y_7+X_7$ |
| $S_{frame}$ (180°) H | | $-S_{frame}$ (0°) H |
| $S_{frame}$ (270°) H | | $-S_{frame}$ (90°) H |

(3) Step 3

Next, the motion compensation with fraction precision is described.

The motion compensation with integer precision is improved by interpolation to fraction precision so that interpolated pels are generated by using pels in a reference block and adjacent pels.

In the present invention, an interpolation is carried out for generating a plurality of interpolated blocks with fraction precision by using original blocks with integer precision after the phase compensation of color sub-carrier on Hadamard conversion matrix region is carried out. The interpolation is carried out for each element of Hadamard converted matrix.

Assuming that X is a matrix on time region, $Y=HXH$ is a matrix on Hadamard conversion region, the following equation is obtained.

$$\begin{aligned} Y(MV_x \pm 1/2, MV_y \pm 1/2) &= HX(MV_x \pm 1/2, MV_y \pm 1/2) \quad (8) \\ &= H[pX(MV_x \pm 1, MV_y \pm 2) + \\ &\quad pX(MV_x, MV_y \pm 2) + \\ &\quad qX(MV_x, MV_y) + \\ &\quad qX(MV_x \pm 1, MV_y)]H \\ &= pY[MV_x \pm 1, MV_y \pm 2) + \\ &\quad pY(MV_x, MV_y \pm 2) + \\ &\quad qY(MV_x, MV_y) + \\ &\quad qY(MV_x \pm 1, MV_y) \end{aligned}$$

where p, q=½ or ¼ or a or b

Figure 5:
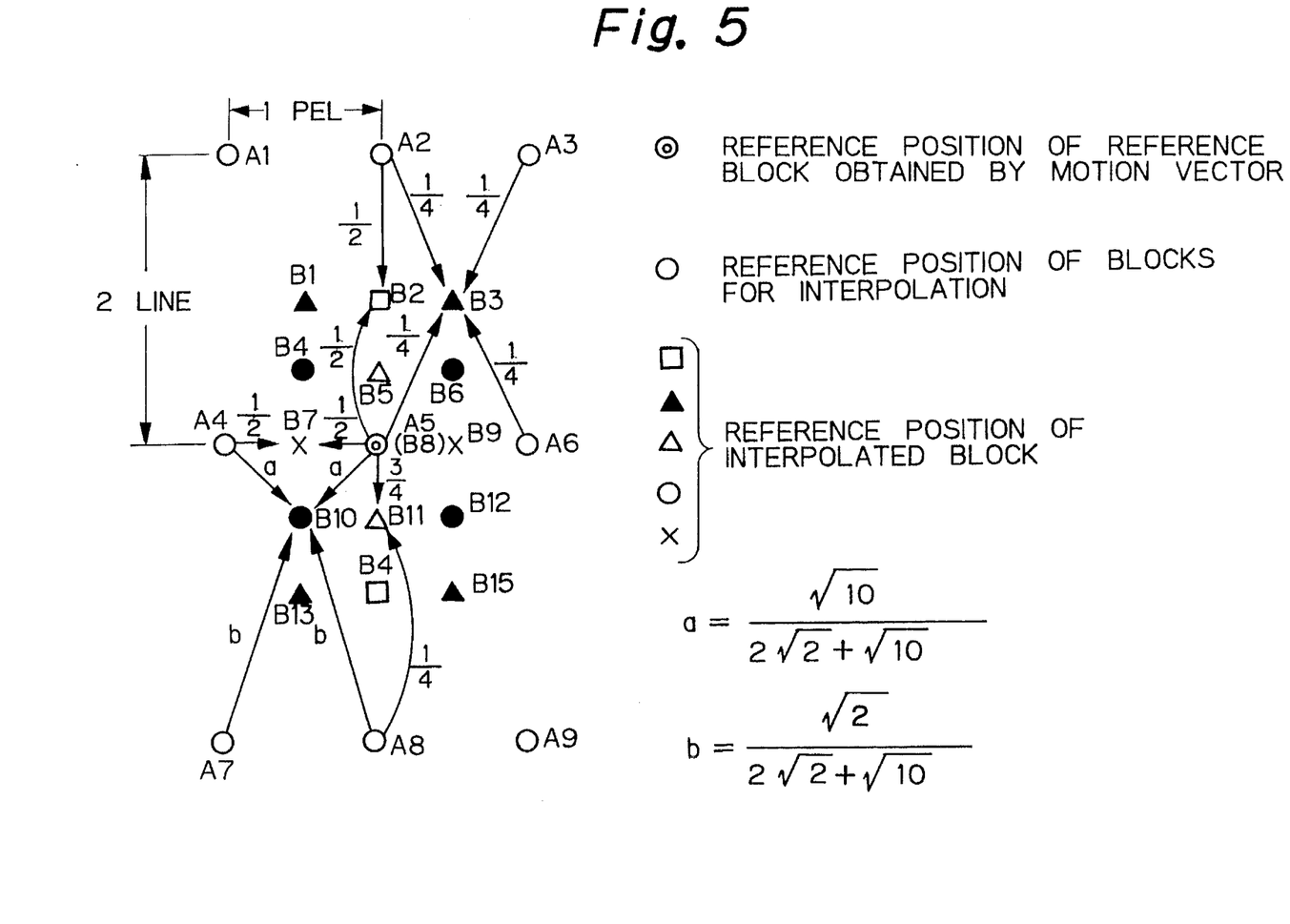
FIG. 5 shows interpolation for motion compensation with precision with half pel spacing and half line spacing.

FIG. 5 shows an interpolation with half pel length and half line precision based upon a motion vector with integer precision. It is assumed in FIG. 5 that length between two adjacent pels in horizontal direction is the same as length between two adjacent lines in vertical direction.

In FIG. 5, the symbols A1 through A9 show reference position of blocks with integer precision obtained by using a motion vector. The A5 shows the block obtained by the motion vector, and A1 through A4, and A6 through A8 are the blocks adjacent the block A5.

The symbols B1 through B15 show reference position of blocks with fracion integer obtained through interpolation.

The value at a pel in the block B1 is interpolated by using the values at the pels A1, A2, A4 and A5 with the weight of ¼ each. The value at a pel in the block B2 is interpolated by using the values at the pels A2 and A5 with the weight of ½ each. The value at a pel in the block B3 is interpolated by using the values at the pels A2, A3, A5 and A6 with the weight of ¼ each. The value at a pel in the block B7 is interpolated by using the values at the pels A4 and A5 with the weight of ½ each. The value at a pel in the block B13 is interpolated by using the values at the pels A4, A5, A7 and A8 with the weight a for A4 and A5, and the weight b for A7 and A8, where a and b are shown in FIG. 5. The value of a pel in the block B11 is interpolated by using the values at the pels A5 and A8 with the weight ¾ for A5 and ¼ for A8. The value at B8 is the same as the value at A5.

Thus, 15 interpolated reference blocks with fraction precision are obtained by using 9 blocks with interger precision. Those interpolated reference blocks are output by the interpolator 13 (FIG. 2) to the prediction block decision circuit 14.

The prediction block decision circuit 14 selects one of the 15 interpolated reference blocks as a prediction block so that the sum of the absolute value of the difference of an element between each reference block and a block to be encoded is the minimum. The selected reference block is forwarded to the subtractor 9, and the adder 10 through the switch SW2 as a prediction block.

As mentioned above, the compression ratio in the encoding is improved by using a prediction reference block with fraction precision obtained through interpolation for the coefficients of Hadamard converted matrix between candidate blocks obtained by using a motion vector.

Said interpolation is carried out after said step (2) for phase error compensation.

(4) The experimental test result of the present invention is described below.

First, the effect for the steps (1), (2) and (3) is shown, and then, the effect of the present invention carrying out all the steps (1), (2) and (3) is shown, with the conventional motion compensation DCT system for NTSC composit video signal.

The parameters for the test are shown in table 2.

FIG. 4 shows the general solution of phase compensation when frequency band of chrominance signal is not restricted. However, since frequency band of chrominance signal of a real image is usually restricted, the power of chrominance signal is concentrated to a small number of coefficients of Hadamard conversion.

Figure 6A:
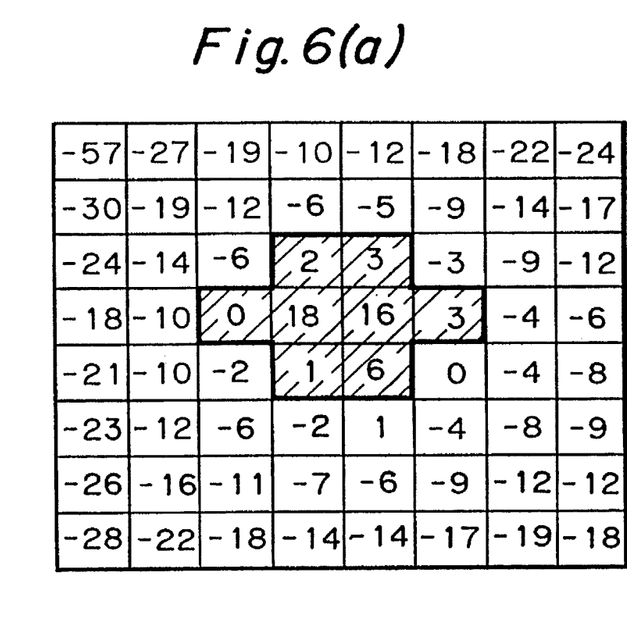
FIG. 6 shows coefficients or elements for phase compensation for color signal in Hadamard converted matrix.
Figure 6B:
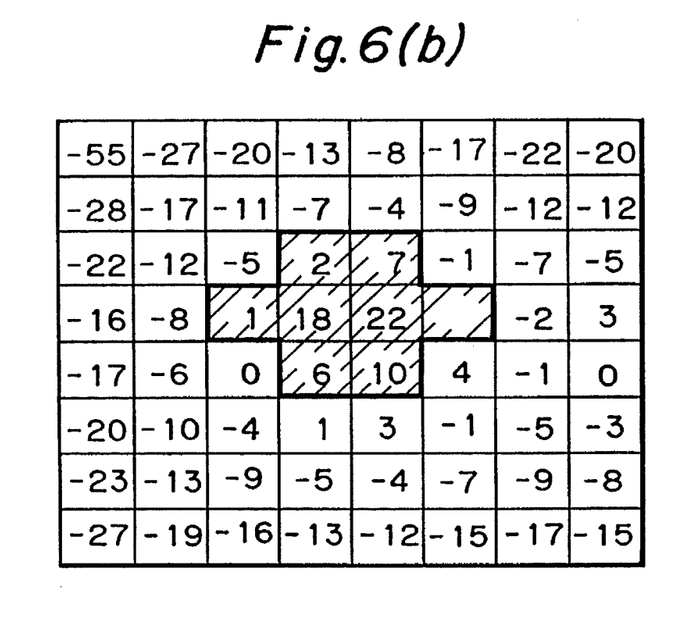

FIG. 6 shows the ratio R=20log(C/Y), where Y is luminance signal separated from composite video signal, and C is chrominance signal separated from composite video signal, where a test pattern is CCIR standard test pattern (flower garden, and mobile and calendar). When the value R is large, the chrominance signal is significant. The eight coefficients (shaded coefficients in FIG. 6) which are not negative in both the patterns are taken as an object for phase compensation of chrominance signal. So, it should be appreciated that phase compensation for only a part of elements of matrix is enough.

Figure 7A:
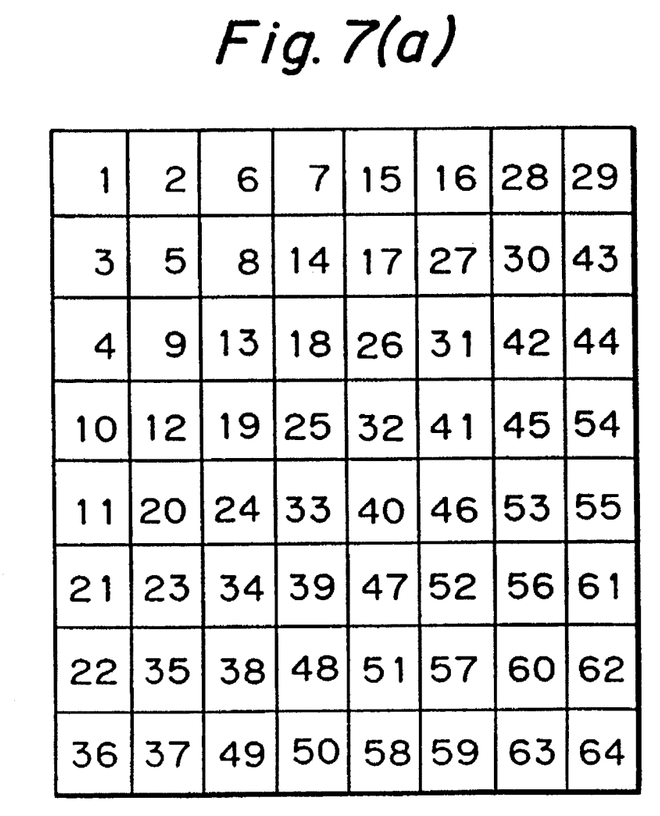
FIG. 7 shows scanning patters in DCT and Hadamard converted matrix.
Figure 7B:
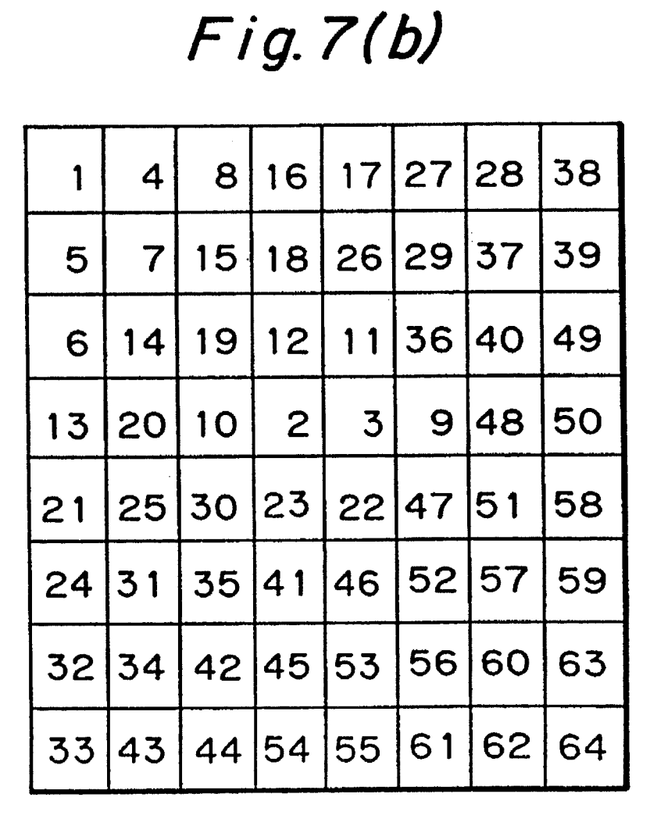

FIG. 7 shows the scanning sequence in Hadamard coefficients, considering composite signal.

Figure 8A:
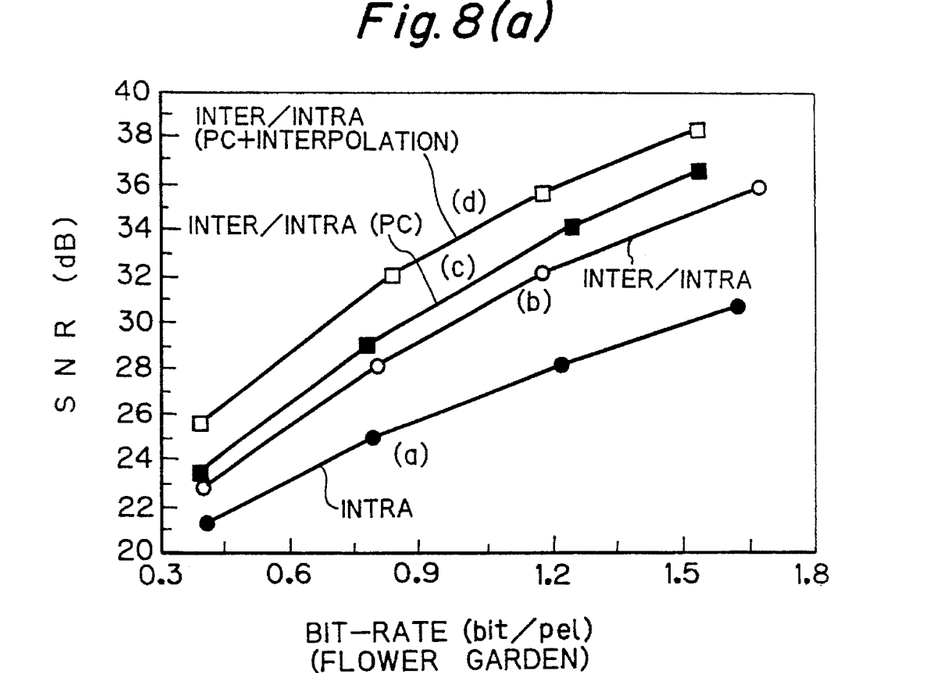
FIG. 8 shows the curves of improvements of picture quality according to the present invention.
Figure 8B:
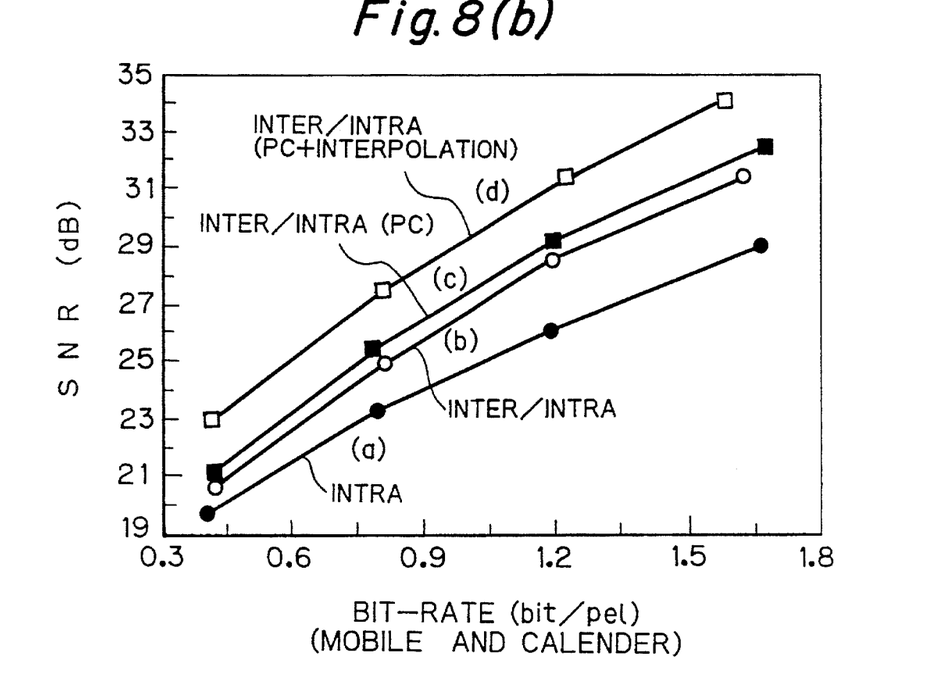

FIG. 8 shows curves of the result of SN(S=255×0.7) versus bit-rate in the simulation with the parameters of table 2. In those curves, (a) shows the case that only intra Hadamard conversion is carried out, (b) shows the case that only the step (1) is carried out so that inter-frame difference on Hadamard conversion is taken, (c) shows the case that the steps (1) and (2) are carried out, and (d) shows the case that all the steps (1), (2) and (3) are carried out.

As shown in those curves, as compared with curve (a) for simple intra frame Hadamard conversion, it is improved by using the step (1) curve (b) by 1–2 dB for the test pattern Mobile and Calendar, and by 2–5 dB for the test pattern Flower Garden, in particular, is should be noted that it is much improved for high bit rate.

When the steps (1) and (2) are carried out in the curve (c), it is further improved by 0.5–1.0 dB for Mobile and Calendar, and the 1–2 dB for Flower Garden.

When the steps (1), (2) and (3) are carried out, it is further improved by approximate 2 db for both the test patterns.

Therefore, the improvement when all the steps (1), (2) and (3) are carried out is 3–5 dB for Mobile and Calendar, and 5–9 dB for Flower Garden as compared with a simple intra frame system (curve (a)). In other words, the bit rate may be half for providing the same S/N ratio.

Next, the present invention is compared with conventional motion compensation DCT (discrete cosine transform) system. It is assumed that the parameters for conven-

TABLE 2

| Experimental parameters | |
|---|---|
| Test data | Flower garden, Mobile and calendar converted from digital component VTR to digital composite VTR by using a commercial digital data converter |
| Range of motion detection (Motion Estimation ME) | horizontal; ±15 pel, vertical; ±14 lines (1 pel and 2 lines precision) 465 (=(15×2+1)×(7×2+1)) vectors, full search (all the 465 vectors are searched for finding the best vector having the minimum prediction error) |
| Unit of ME | 16 pel × 16 line (macro block) |
| Quantization | linear quantization with fixed step size for all the elements of matrix |
| Variable length code | conversion coefficient; 2 dimensional runlength motion vector;B2 code,    X;1/2 pel precision                                             Y;1/2 line precision |
| Refresh | 15 frames interval | tional motion compensation DCT system (range of motion detection, unit, refresh, et al) are the same as those in table 2. It is also assumed that the quantization step size is the same for both luminance signal and chrominance signal, irrespective of coefficients, and the scanning sequence of DCT coefficients is shown in FIG. 7 for both luminance signal and chrominance signal. The conversion from composite signal to component signal in conventional system is shown in FIG. 9, and the parameters of the filters for the conversion in FIG. 9 are shown below.

Figure 10A:
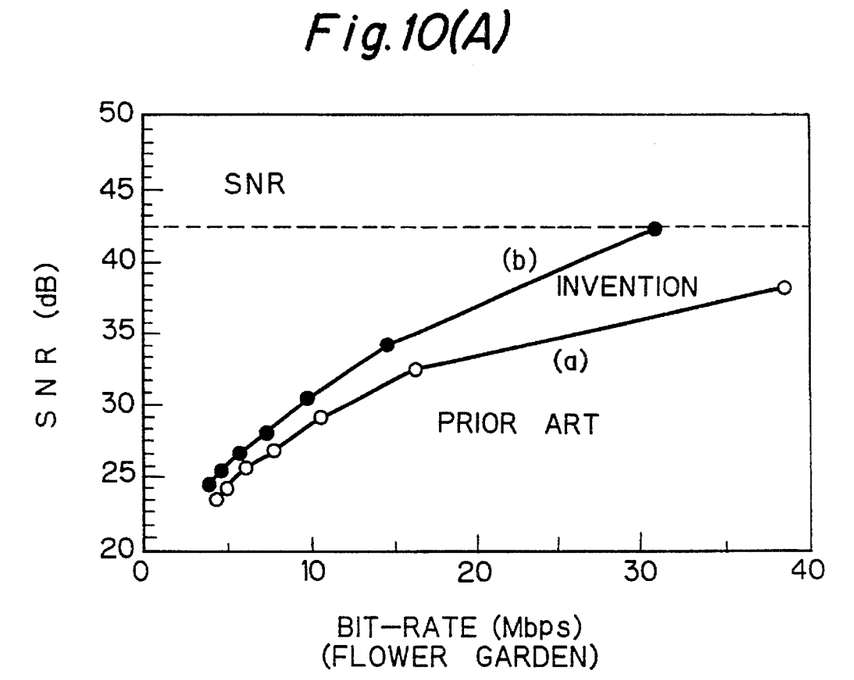
FIG. 10 shows comparison of picture quality between present invention and a prior art.
Figure 10B:
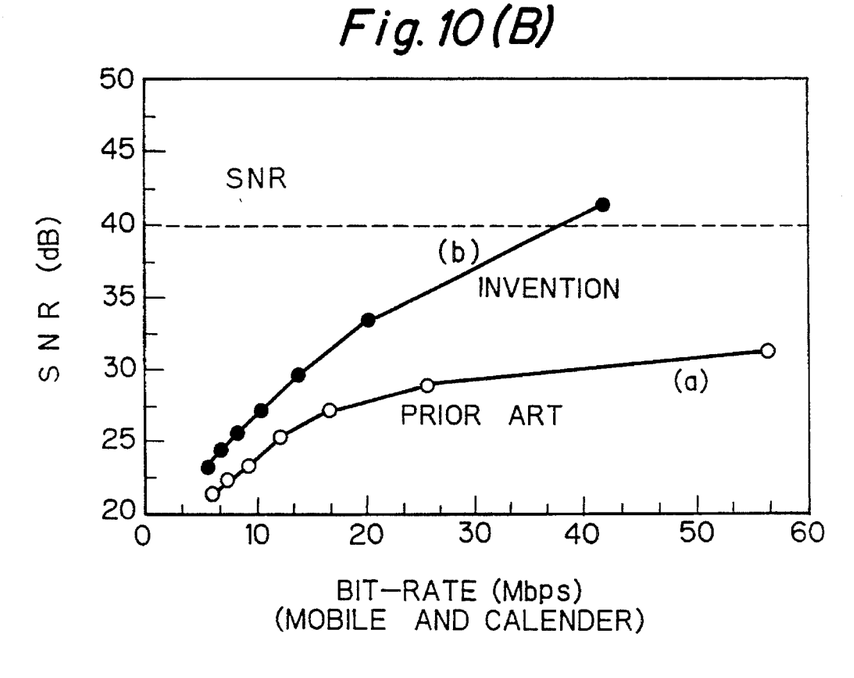

$H_{Y/C}$(comb filter);
horizontal; $(-1/32)(1 - z^{-2})^2(1 + z^{-4})^2(1 + z^{-8})$
vertical; $(-1 + 2w^{-1} - w^{-2})/4$
$w$ is 2 lines up $H_{R-Y}$(low pass up to $f_{sc}$); $(1/5y\,¶) - (1/3¶)z^{-2} + (1/¶)z^{-4} +$
$(1/2)z^{-5} + (1/¶)z^{-6} - (1/3¶)z^{-8} = (1/5¶)z^{-10}$ $H_{B-Y}$(low pass up to $f_{sc}$);    ditto $H_{R-Y}$, and $H_{B-Y}$ are not used FIG. 10 shows the test result, where (A) shows the result for the test pattern Flower Garden, and (B) shows the result for the test pattern Mobile and calendar. In those figures, the curve (a) shows the case of conventional system (component signal), and the curve (b) shows the case of the present invention (steps (1), (2) and (3)).

As shown in those figures, according to the present invention, the slope of the velocity-distortion curve is almost constant in the range shown in the figure (SNR=20–40 dB), and no saturation is observed. However, in the conventional system, the curves are tend to saturate less than 40 dB.

The value of SNR according to the present invention is improved by 2–3 dB in low bit rate lower than 10 Mbps, and even 5–10 dB in high bit rate higher than 20 Mbps, as compared with that of the conventional system. The main reason of the improvement by the present invention is that no conversion between composite signal and component signal is used.

As described above in detail, the present invention provides the direct encoding system for composite video signal by using Hadamard conversion, without separating luminance signal and chrominance signal.

From the foregoing it will now be apparent that a new and improved direct encoding system for composite video signal has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. (1) Direct Encoding System of Composite video using inter-frame motion compensation comprising;

an input terminal for receiving a block of input composite video signal which includes both luminance signal (Y) and chrominance signal (C) modulated with color sub-carrier signal, said block being a part of video frame, and having a plurality of pels, a first Hadamard converter coupled with said input terminal for effecting Hadamard conversion for each block in said input composite video signal, a subtractor for providing difference between each element of matrix of output of said first Hadamard converter and each related element of matrix of a prediction block, a quantizer for quantizing output of said subtractor, a first encoder for encoding output of said quantizer, an inverse quantizer coupled with output of said quantizer, an adder coupled with output of said inverse quantizer for providing sum of said output and said prediction block, a second Hadamard converter coupled with output of said adder for providing inverse Hadamard conversion, a frame memory coupled with output of said second Hadamard converter to store a frame of locally decoded video signal, a motion detector coupled with said input terminal through a luminance separation circuit, and output of said frame memory through a luminance separation circuit to provide motion vector ($MV_x$, $MV_y$) of each block between a current frame and a preceding frame, a composite motion compensator having at least a third Hadamard conversion unit, and a phase compensation circuit, coupled with output of said motion detector, and output of said frame memory, to determine a reference block in a preceding frame according to said motion vector ($MV_x$, $MV_y$), to carry out Hadamard conversion to said reference block, to effect phase compensation of color sub-carrier of said Hadamard converted reference block, so that the phase compensated reference block is applied to said subtractor as said prediction block, a second encoder for encoding said motion vector, a multiplexer for multiplexing outputs of said first encoder and said second encoder, and an output terminal coupled with output of said multiplexer to provide encoded video signal.

2. Direct encoding system of composite video signal according to claim 1, wherein said phase compensation circuit is coupled with output of said third Hadamard conversion unit, and has means for exchanging and inversing sign of lines of matrix of an Hadamard converted reference block.

3. Direct encoding system of composite video signal according to claim 1, wherein a first switch (SW1) is provided for switching input of said quantizer between output of said subtractor and output of said first Hadamard conversion unit and a second switch (SW2) is provided for switching input of said adder between output of said composite motion compensator and a null point so that input of said quantizer is switched to output of said subtractor and input of said adder is coupled with output of said composite motion compensator only when sum of absolute value of each element of matrix of a block to be encoded of output of said subtractor is equal to or smaller than that of output of said first Hadamard conversion unit.

4. Direct encoding system of composite video signal according to claim 1, wherein phase compensation of a reference block is carried out only for a part of elements of Hadamard converted reference block.

5. Direct encoding system of composite video signal according to claim 1, wherein said composite motion compensator has further an interpolator, and a prediction block decision circuit, and is further coupled with output of said first Hadamard conversion unit, said composite motion compensator takes a plurality of candidate reference blocks which are located adjacent with each other in a frame memory, effects phase compensation for each candidate reference block, effects interpolation for providing reference blocks with fraction precision by said candidate reference blocks, and said prediction block decision circuit selects a prediction block from said reference blocks with fraction precision so that sum of absolute value of each elements of the difference of the matrices between a block to be encoded and each reference block is the minimum.

6. Direct encoding system of composite video signal according to claim 3, wherein said block has 8×8 pels, each of Hadamard conversion unit is 8 order Hadamard converter, number of candidate reference blocks is 9, and number of interpolated reference blocks is 15.

* * * * *